United States Patent
Hung

(10) Patent No.: US 10,084,907 B1
(45) Date of Patent: Sep. 25, 2018

(54) METHOD FOR UNLOCKING SCREEN AND ELECTRONIC DEVICE USING THE SAME

(71) Applicant: Universal Global Technology (Kunshan) Co., Ltd, Kunshan, Jiangsu Province (CN)

(72) Inventor: Yung-Shuan Hung, Kunshan (CN)

(73) Assignee: UNIVERSAL GLOBAL TECHNOLOGY (KUNSHAN) CO., LTD, Kunshan, Jiangsu Province (CN)

( * ) Notice: Subject to any disclaimer, the term of this patent is extended or adjusted under 35 U.S.C. 154(b) by 0 days.

(21) Appl. No.: 15/795,997

(22) Filed: Oct. 27, 2017

(30) Foreign Application Priority Data

Sep. 6, 2017 (CN) .......................... 2017 1 0797267

(51) Int. Cl.
*H04M 1/00* (2006.01)
*H04M 1/725* (2006.01)
*G06F 3/0488* (2013.01)

(52) U.S. Cl.
CPC .... *H04M 1/72577* (2013.01); *G06F 3/04883* (2013.01)

(58) Field of Classification Search
CPC ................. H04M 1/72577; G06F 3/04883
USPC ................................................ 455/411, 410
See application file for complete search history.

(56) References Cited

U.S. PATENT DOCUMENTS

| | | | | |
|---|---|---|---|---|
| 9,280,282 B2 * | 3/2016 | Liang | ................. | G06F 3/04883 |
| 9,733,827 B2 * | 8/2017 | Borovsky | ........... | G06F 3/04883 |
| 2012/0084691 A1 * | 4/2012 | Yun | ................... | H04M 1/72519 715/769 |
| 2014/0066017 A1 * | 3/2014 | Cho | .................. | H04M 1/72519 455/411 |
| 2014/0359757 A1 * | 12/2014 | Sezan | ..................... | G06F 21/32 726/19 |
| 2014/0365904 A1 * | 12/2014 | Kim | ....................... | G06F 3/0484 715/741 |
| 2015/0015493 A1 * | 1/2015 | Hsieh | .................... | G06F 3/0488 345/173 |
| 2017/0300682 A1 * | 10/2017 | Alten | ...................... | G06F 21/32 |
| 2018/0189468 A1 * | 7/2018 | Shim | ..................... | G06F 3/0488 |

FOREIGN PATENT DOCUMENTS

TW         10112449 A  *  6/2012  ............. G06F 3/041

* cited by examiner

*Primary Examiner* — Khai M Nguyen
(74) *Attorney, Agent, or Firm* — Li & Cai Intellectual Property (USA) Office

(57) ABSTRACT

Disclosed are an electronic device and a method for unlocking screen. The electronic device includes a touch screen, a storage and a processor. The touch screen displays unlocking blocks and non-unlocking blocks in the screen-locking mode of the electronic device. A plurality of files are stored in the storage. In the screen-locking mode, the processor detects a motion track generated when an object is touching the touch screen. If the object has touched the unlocking blocks and the motion track is satisfied with a first unlocking sequence, the processor makes the screen-locking mode released and loads all files. If the object has touched the unlocking blocks and the motion track is satisfied with a second unlocking sequence, the processor makes the screen-locking mode released and loads some of the files. Thus, according to different motion tracks, the electronic device determines to load all or some of the files.

9 Claims, 6 Drawing Sheets

METHOD FOR UNLOCKING SCREEN AND ELECTRONIC DEVICE USING THE SAME

BACKGROUND OF THE INVENTION

1. Field of the Invention

The present disclosure relates to a method for unlocking screen and an electronic device using the same; in particular, to a method for unlocking screen and an electronic device that unlocks a touch screen according to a motion track generated when a user is touching the touch screen and a sequence the user follows to touch the touch screen.

2. Description of Related Art

Currently, most of smart electronic devices, such as mobile phones or tablets have a touch screen as an input apparatus and an output apparatus. To prevent a user from mistaken touches on the touch screen and to prevent other people from sneaking a glance at a user's personal files, the electronic device is equipped with a screen lock mechanism. When one tends to unlock the electronic device, he/she can input a code or a pattern that is generated when he/she is touching the screen to unlock the screen. The electronic device compares the input code or pattern with a predetermined code or pattern. If the input code or pattern is satisfied with the predetermined code or pattern, the screen of the electronic device can be unlocked (i.e. the screen-locking mode is released).

Under the circumstances that other people can see the screen of the user's electronic device, the user may or may not mind other people reading all information displayed on the screen of his/her electronic device (including personal files). However, there has not been an operation mechanism that makes the electronic device able to determine whether to display all files or only display some files on the screen when the screen-locking mode is released.

SUMMARY OF THE INVENTION

The present disclosure provides a method for unlocking screen and an electronic device using the same. The method for unlocking screen and the electronic device using the same can unlock a touch screen and load all files or some files (excluding the unauthorized files) according to a motion track generated when a user is touching the touch screen and a sequence the user follows to touch the touch screen.

The electronic device provide by the present disclosure includes a touch screen, a storage and a processor. The touch screen displays a plurality of unlocking blocks and a plurality of non-unlocking blocks in a screen-locking mode of the electronic device. The storage stores an unlocking code and a plurality of files. The unlocking code corresponds to the unlocking blocks according to a first unlocking sequence and a second unlocking sequence. The first unlocking sequence is reverse to the second unlocking sequence. The first unlocking sequence corresponds to all of the files, and the second unlocking sequence corresponds to some of the files. The processor is coupled to the touch screen and the storage. The processor detects a motion track of an object touching the touch screen. The processor makes the screen-locking mode released and loads all of the files when the object is touching the touch screen and the motion track is satisfied with the first unlocking sequence. The processor makes the screen-locking mode released and loads some of the files when the object is touching the touch screen and the motion track is satisfied with the second unlocking sequence.

In one embodiment of the electronic device provide by the present disclosure, the processor builds a relationship between the second unlocking sequence and some of the files according to an instruction generated through a setting interface displayed on the touch screen.

In one embodiment of the electronic device provide by the present disclosure, the unlocking blocks and the non-unlocking blocks form a touch area. The processor arranges the position of each unlocking block and the position of each non-unlocking block in the touch area according to an instruction generated through a setting interface displayed on the touch screen.

In one embodiment of the electronic device provide by the present disclosure, some of the files corresponded to the second unlocking sequence have similar file types.

In one embodiment of the electronic device provide by the present disclosure, the processor controls the touch screen to display at least one image frame after the processor makes the screen-locking mode released. Data of the unloaded files will not be displayed in the image frame.

In one embodiment of the electronic device provide by the present disclosure, the processor makes the screen-locking mode released and loads the files corresponded to the first unlocking sequence when the object has touched the unlocking blocks according to the first unlocking sequence within a predetermined time.

In one embodiment of the electronic device provide by the present disclosure, the processor makes the screen-locking mode released and loads some of the files corresponded to the second unlocking sequence when the object has touched the unlocking blocks according to the second unlocking sequence within a predetermined time.

The method for unlocking screen provide by the present disclosure is for making a screen-locking mode of an electronic device released. The method includes steps as follows: (A) displaying a plurality of unlocking blocks and a plurality of non-unlocking blocks on a touch screen of the electronic device in a screen-locking mode, wherein the electronic device stores an unlocking code and a plurality of files, the unlocking code corresponds to the unlocking blocks according to a first unlocking sequence and a second unlocking sequence, the first unlocking sequence is reverse to the second unlocking sequence, the first unlocking sequence corresponds to all of the files, and the second unlocking sequence corresponds to some of the files; (B) detecting a motion track of an object touching the touch screen; (C) making the screen-locking mode released and loading the files, when the object is touching the touch screen and the motion track is satisfied with the first unlocking sequence; and (D) making the screen-locking mode released and loading some of the files, when the object is touching the touch screen and the motion track is satisfied with the second unlocking sequence.

To sum up, by using the electronic device and the method for unlocking screen provided by the present disclosure, the screen-locking mode can be released with all files or some files loaded according to a motion track generated after a user has touched all of the unlocking blocks. Therefore, the user can decide whether to allow personal files to be seen by other people by using different ways to unlock the screen of his/her electronic device under the circumstances that other people can sneak a glance at the screen of the user's electronic device. In addition, once the user sets the first unlocking sequence and determines the unauthorized files by using a setting interface, the electronic device can accordingly determine to load all of the files or some of the files when the screen-locking mode is released. The entire setting process is therefore quite simple.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

Figure 1:
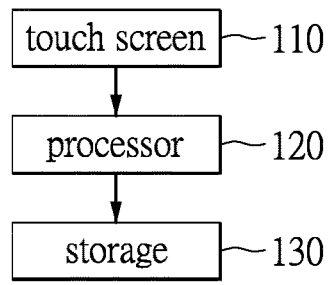
FIG. 1 shows a schematic diagram of an electronic device according to one embodiment of the present disclosure.

The present disclosure provides an electronic device. Referring to FIG. 1, a schematic diagram of an electronic device according to one embodiment of the present disclosure is shown. As shown in FIG. 1, when an electronic device 100 is working in a screen-locking mode, the screen-locking mode can be released according to the user operation. The user can read information displayed by a touch screen 110 of the electronic device 100 when the screen-locking mode is released. For example, the electronic device 100 can be a smart phone, a tablet, a laptop or other electronic devices having touching screens, but it is not limited herein.

The electronic device 100 includes a touch screen 110, a storage 130 and a processor 120. The processor 120 is coupled to the touch screen 110 and the storage 130. A plurality of unlocking blocks BK1, BK2, BK3, BK4 and BK5 and a plurality of non-unlocking blocks nBK1, nBK2, nBK3 and nBK4 are displayed by the touch screen 110 in the screen-locking mode. The unlocking blocks BK1~BK5 and the non-unlocking blocks nBK1~nBK4 form a touch area TCH on the touch screen 110. The processor 120 determines whether to make the screen-locking mode of the electronic device 100 released according to how a user touches the touch area TCH.

An unlocking code and a plurality of files are stored in the storage 130. The unlocking code corresponds to the unlocking blocks BK1~BK5 according to a first unlocking sequence and a second unlocking sequence. It should be noted that, the first unlocking sequence is reverse to the second unlocking sequence. For example, if the first unlocking sequence is orderly defined from the unlocking block BK1 to the unlocking block BK5, the second unlocking sequence should be orderly defined from the unlocking block BK5 to the unlocking block BK1.

In addition, the first unlocking sequence corresponds to all of the files stored in the storage 130, and the second unlocking sequence corresponds to some of the files stored in the storage 130. In this embodiment, the files corresponded to the first unlocking sequence are all files of the electronic device 100, and the files corresponded to the second unlocking sequence are authorized files (i.e. not personal files of the user). However, the corresponding relationship between all of the files and the first unlocking sequence or between some of the files and the second unlocking sequence can be freely designed depending on needs.

Figure 3A:
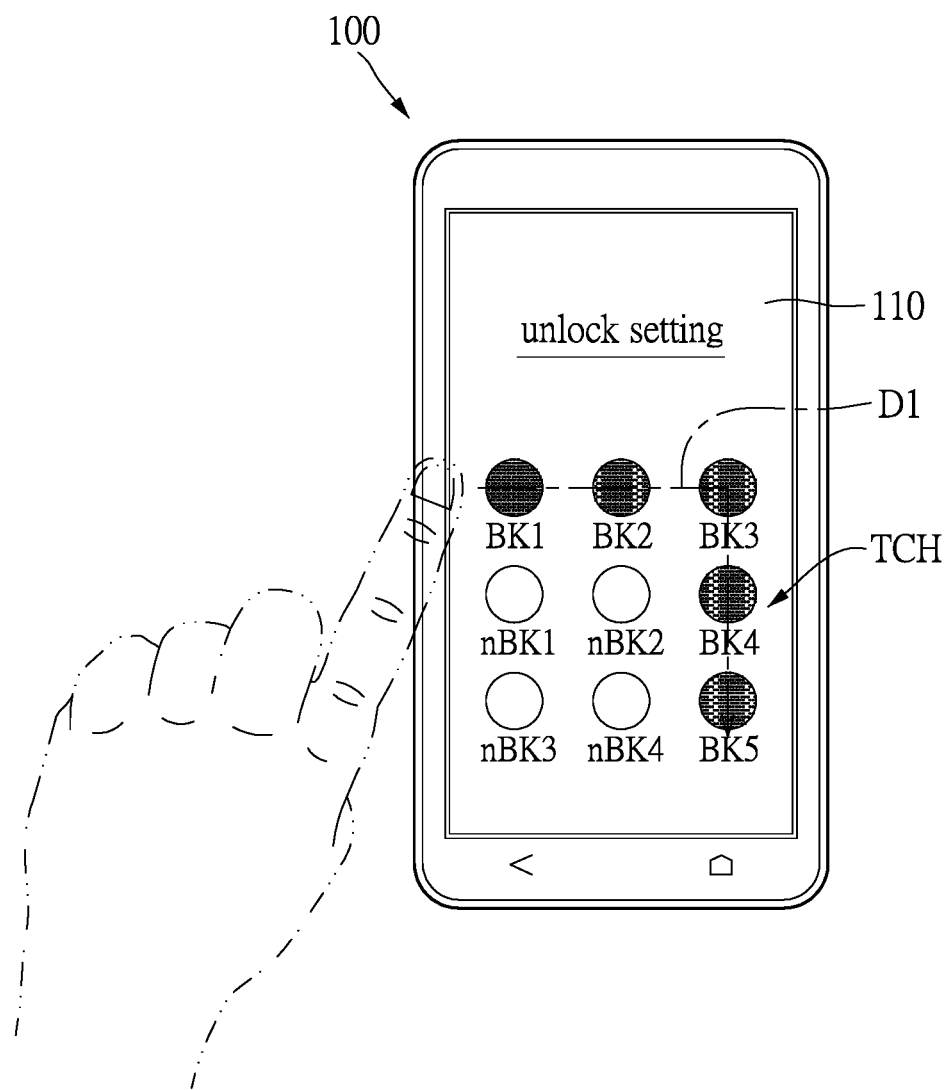
FIG. 3A shows a schematic diagram of a setting interface of the electronic device according to one embodiment of the present disclosure.

How the processor 120 sets the unlocking blocks, the non-unlocking blocks, the first unlocking sequence, the second unlocking sequence and authorized/unauthorized files according to an instruction generated through a setting interface displayed on the touch screen 110 is illustrated in the following descriptions. Referring to FIG. 3A, a schematic diagram of a setting interface of the electronic device according to one embodiment of the present disclosure is shown. As shown in FIG. 3A, a user operates the touch screen 110 to make an unlock setting image shown, which is one of images of the setting interface. Within the unlock setting image, the touch area TCH is displayed on the touch screen 110. The first unlocking sequence, the unlocking blocks and the non-unlocking blocks can be determined according to a motion track when a user is touching the touch area TCH on the touch screen 110. In FIG. 3A, the unlocking blocks are labeled by BK1~BK5, the non-unlocking blocks are labeled by nBK1~nBK4, and the first unlocking sequence D1 is orderly defined from the unlocking block BK1 to the unlocking block BK5.

Figure 3B:
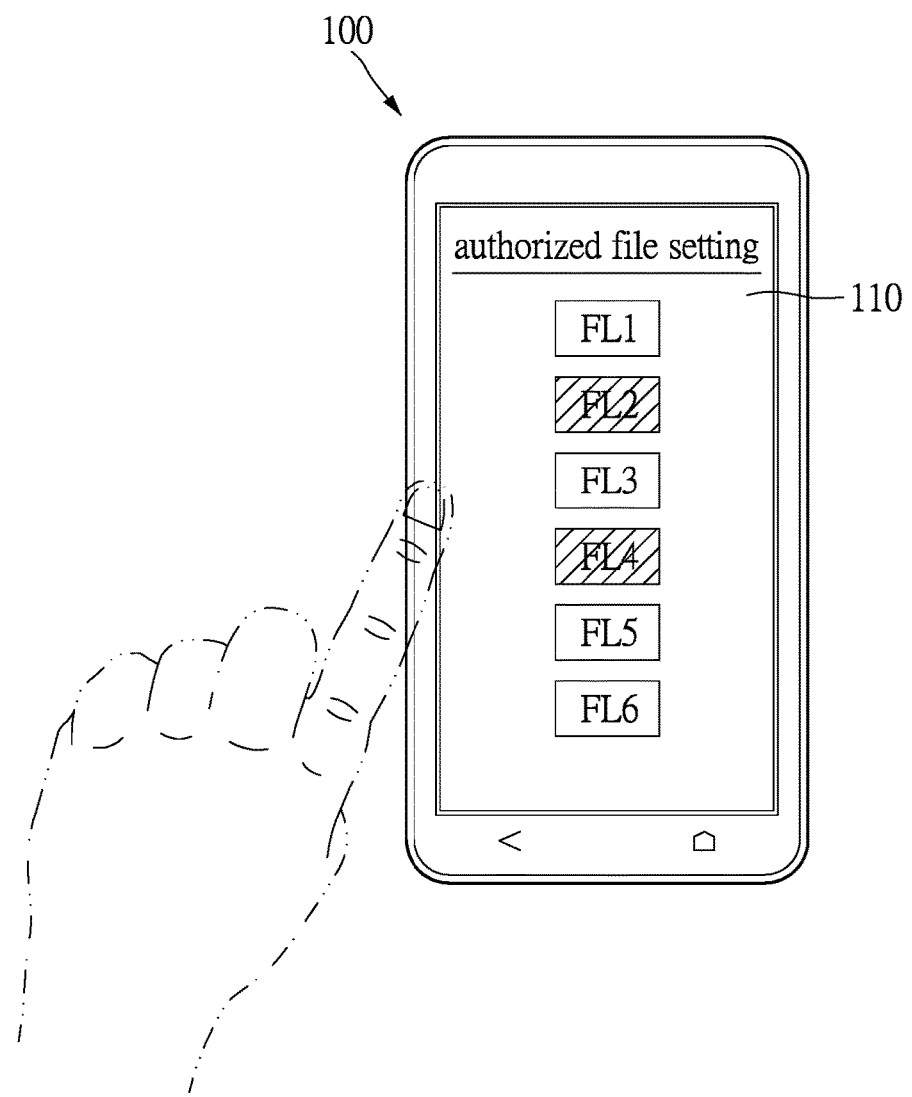
FIG. 3B shows a schematic diagram of a setting interface of the electronic device according to another embodiment of the present disclosure.

After that, an authorized/unauthorized files setting image is shown on the touch screen 110, which is another image of the setting interface. Referring to FIG. 3B, a schematic diagram of a setting interface of the electronic device according to another embodiment of the present disclosure is shown. Within the authorized/unauthorized files setting image, a plurality of files stored in the storage 130 are shown. For example, the storage 130 stores six files in total, as shown by the following Table (1). The files FL1, FL2, FL3, FL4, FL5 and FL6 correspond respectively to the image frames AP1, AP2, AP3, AP4, AP5 and AP6, each of the files FL1, FL2, FL3, FL4, FL5 and FL6 has a file type. The image frames AP1, AP2, AP3, AP4, AP5 and AP6 are displayed on the touch screen 110. The files FL1, FL2, FL3, FL4, FL5 and FL6 can come from an external server (that is, the user downloads them from the external server), or can be built by the electronic device 100 and then stored in the storage 130. The file type of each of the files FL1, FL2, FL3, FL4, FL5 and FL6 can be freely set by user or can be determined according to the meta-data of the file. How the files FL1, FL2, FL3, FL4, FL5 and FL6 are generated is not restricted herein.

TABLE (1)

| File Name | Image Frame | File type |
|-----------|-------------|-----------|
| FL1 | AP1 | Data |
| FL2 | AP2 | Video |
| FL3 | AP3 | Game |
| FL4 | AP4 | Game |
| FL5 | AP5 | Data |
| FL6 | AP6 | Video |

Again referring to FIG. 3B, within the authorized/unauthorized files setting image, the user can determine which file in the Table (1) is an unauthorized file that is unwilling to be seen by others. For example, the user can determine that the files having certain file types are unauthorized files. In this example, if the user determines that the files having the file type "Data" are unauthorized files, the file FL1 and the file FL5 are set to be unauthorized files. It should be noted that, if it is not necessary for the user to determine the unauthorized files, the authorized/unauthorized files setting image can be skipped by the user.

For ease of illustration, in the following descriptions, the file FL2 and the file FL4 are set as unauthorized files. After setting the unlocking blocks, the non-unlocking blocks, the first unlocking sequence and the authorized/unauthorized files, the processor 120 arranges the position of each unlocking block and the position of each non-unlocking block in the touch area TCH. Also, the processor 120 builds a second unlocking sequence according to the first unlocking sequence, wherein the first unlocking sequence is reverse to the second unlocking sequence. Moreover, the processor 120 builds the relationship between the second unlocking sequence and files that are authorized (i.e. the files FL1, FL3, FL5 and FL6). Finally, the position of each unlocking block and the position of each non-unlocking block in the touch area TCH, the second unlocking sequence, and the relationship between the second unlocking sequence and the files that are authorized are stored in the storage 130.

From the above, once the user sets the first unlocking sequence and determines the unauthorized files by using the setting interface, the processor 120 can accordingly build the unlocking blocks, the non-unlocking blocks, the second unlocking sequence, and the relationship between the second unlocking sequence and the files that are authorized, which makes the entire setting process simplified.

When the setting process is finished, the unlocking code in the storage 130 corresponds to the unlocking blocks BK1~BK5 according to the first unlocking sequence D1 and the second unlocking sequence, wherein the first unlocking sequence is reverse to the second unlocking sequence. The first unlocking sequence corresponds to all of the files FL1~FL6 (herein, the files FL1~FL6 represent all files in the electronic device 100, but the electronic device 100 is not restricted to only have six files), and the second unlocking sequence corresponds to some of the files (e.g. authorized files, like files FL1, FL3, FL5 and FL6).

Figure 2:
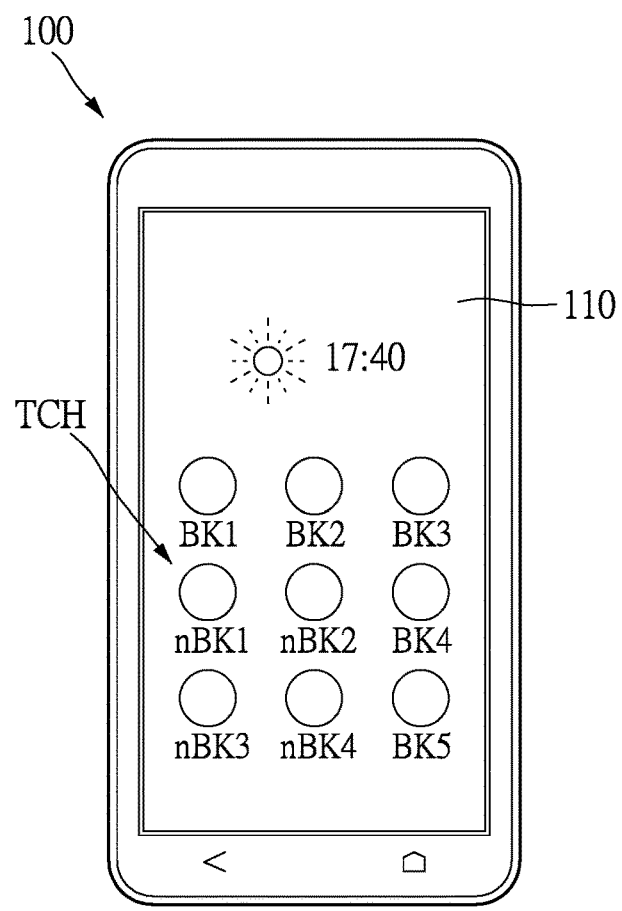
FIG. 2 shows a schematic diagram of a touch screen of the electronic device according to one embodiment of the present disclosure.

Again referring to FIG. 2, when the electronic device 100 is working in the screen-locking mode, the processor 120 detects a motion track generated when an object (e.g. a finger of the user) is touching the touch screen 110, and accordingly determines whether to make the screen-locking mode released. If the user does not touch the unlocking blocks BK1~BK5, or touches one of the unlocking blocks nBK1~nBK4, the user fails to unlock the screen of the electronic device 100. In this case, the processor 120 will not make the screen-locking mode released.

If the user has touched the unlocking blocks BK1~BK5 and the generated motion track is satisfied with the first unlocking sequence D1, the user unlocks the screen of the electronic device 100. In this case, the processor 120 loads the files FL1~FL6 according to the first unlocking sequence D1. In another case, if the user has touched the unlocking blocks BK1~BK5 and the generated motion track is satisfied with the second unlocking sequence, the user also can unlock the screen of the electronic device 100. In addition, the processor 120 loads the files FL1, FL3, FL5 and FL6 according to the second unlocking sequence.

In other embodiments, the processor 120 further determines whether the object (e.g. a finger of the user) has touched the unlocking blocks according to the first unlocking sequence or the second unlocking sequence within a predetermined time (e.g. three seconds). For example, if the user has touched the unlocking blocks BL1~BL5 and the generated motion track is satisfied with the first unlocking sequence D1, the processor 120 will make the screen-locking mode released. Also, the processor 120 loads the files FL1~FL6 according to the first unlocking sequence D1. For another example, if the user has touched the unlocking blocks BL1~BL5 and the generated motion track is satisfied with the second unlocking sequence, the processor 120 will also make the screen-locking mode released. In addition, the processor 120 loads the files FL1, FL3, FL5 and FL6 according to the second unlocking sequence.

Figure 4:
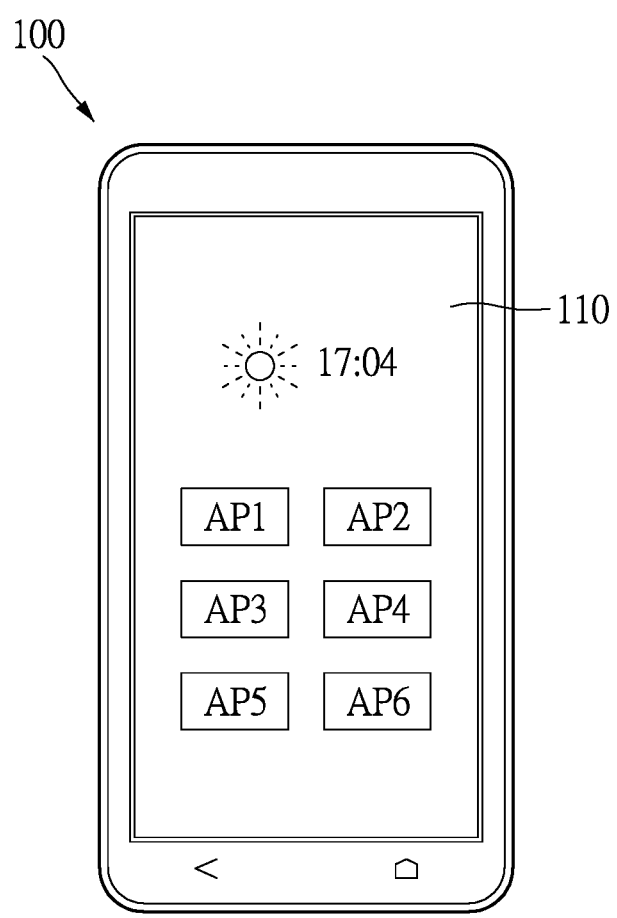
FIG. 4 is a schematic diagram showing that the touch screen of the electronic device displays an image frame according to one embodiment of the present disclosure.
Figure 5:
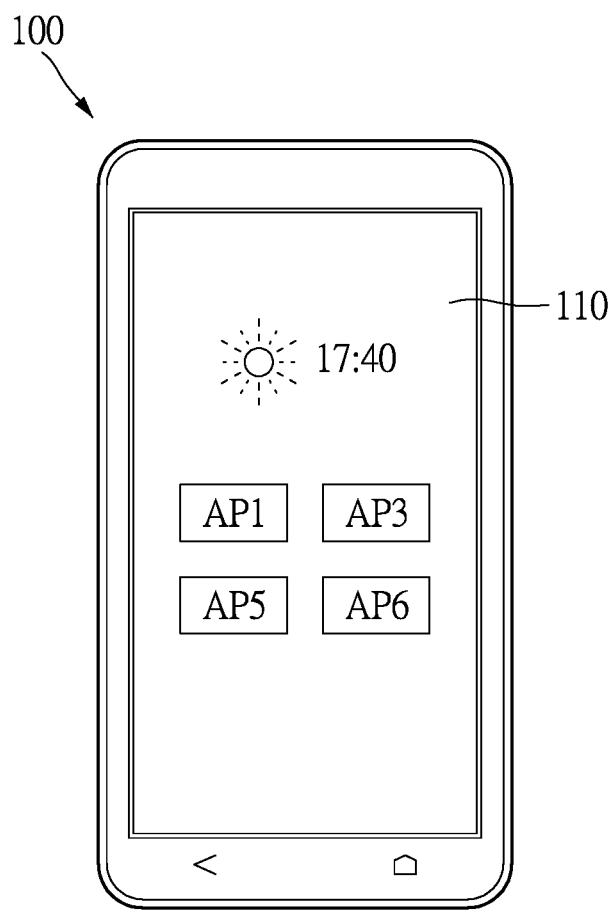
FIG. 5 is a schematic diagram showing that the touch screen of the electronic device displays an image frame according to another embodiment of the present disclosure.

After loading the files, the processor 120 controls the touch screen 110 to display at least one image frame. It should be noted that, data of the unloaded files will not be displayed in this image frame. Referring to FIG. 4 and FIG. 5, schematic diagrams showing that the touch screen of the electronic device displays an image frame according to embodiments of the present disclosure are shown. According to FIG. 4, FIG. 5 and the Table (1), the files FL1~FL6 correspond respectively to the image frames AP1~AP6. As shown in FIG. 4, after the processor 120 loads the files FL1~FL6 according to the first unlocking sequence, the image frames AP1~AP6 corresponding to the files FL1~FL6 are displayed by the touch screen 110. As shown in FIG. 5, after the processor 120 loads the files FL1, FL3, FL5 and FL6 according to the second unlocking sequence, the image frames AP1, AP3, AP5 and AP6 corresponding to the files FL1, FL3, FL5 and FL6 are displayed by the touch screen 110.

From the above, according to how the unlocking blocks and the non-unlocking blocks displayed on the touch screen 110 are touched (e.g. the non-unlocking blocks are not touched and the unlocking blocks are touched according to the first unlocking sequence and the second unlocking sequence), the processor 120 can determine whether to make the screen-locking mode released and can determine which file should be loaded when the screen-locking mode is released (e.g. all files FL1~F16 should be loaded or only the authorized files FL1, FL3, FL5 and FL6 should be loaded).

Therefore, under the circumstances that other people can see the screen of the user's electronic device 100, if the user does not mind other people reading the information displayed on the screen of the electronic device 100 when the user needs to unlock the screen of his/her electronic device 100, he/she chooses to touch the unlocking blocks according to the first unlocking sequence. In this manner, the screen of his/her electronic device 100 can be unlocked and all files are loaded by the processor 120. Conversely, if the user does not want other people to read the information displayed on the screen of the electronic device 100 when the user needs to unlock the screen of his/her electronic device 100, he/she chooses to touch the unlocking blocks according to the second unlocking sequence. In this manner, the screen of his/her electronic device 100 can be unlocked and only authorized files are loaded by the processor 120, which can protect personal files from being seen by other people.

Figure 6:
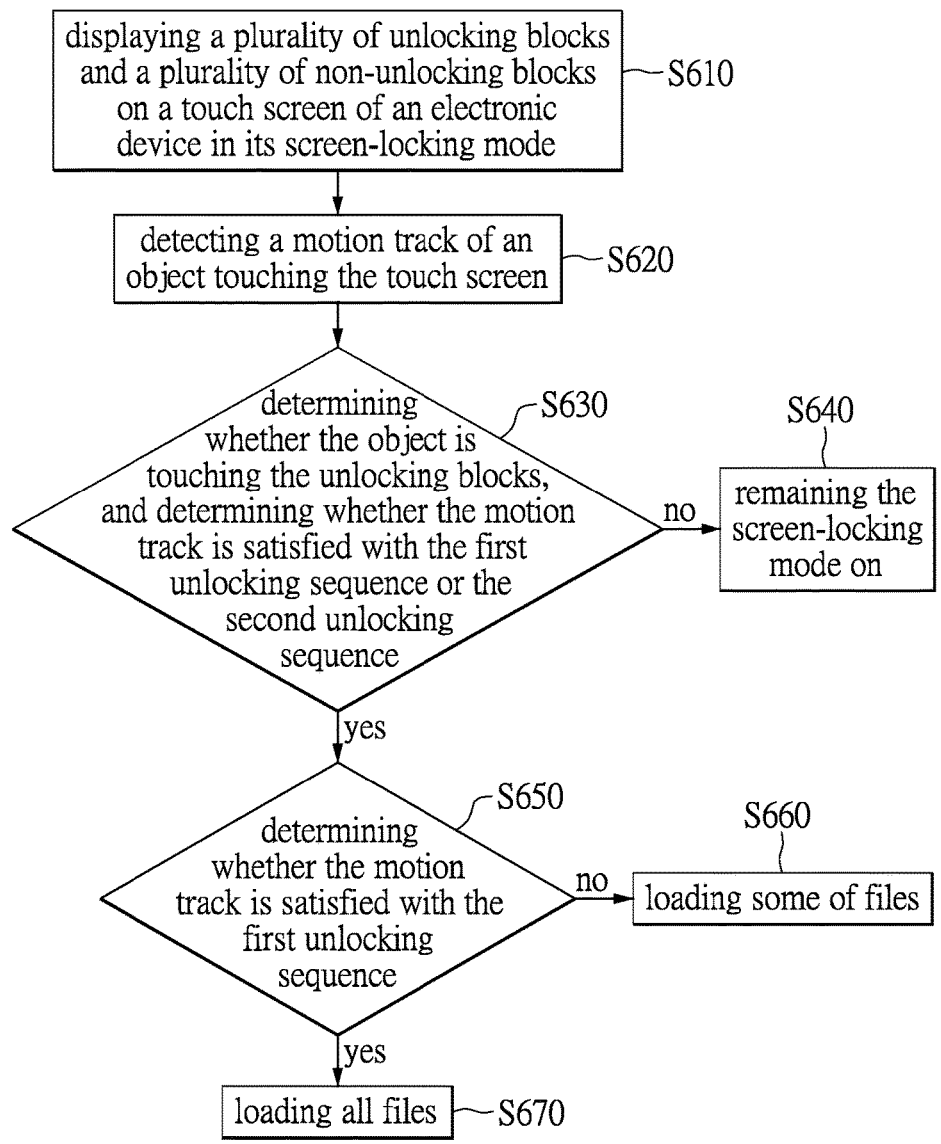
FIG. 6 shows a flow chart of a method for unlocking screen according to one embodiment of the present disclosure.

Corresponding to the electronic device described above, the present disclosure also provides a method for unlocking screen. This method is adapted to the electronic device described above. Referring to FIG. 6, a flow chart of a method for unlocking screen according to one embodiment of the present disclosure is shown. In step S610, the processor 120 controls the touch screen 110 to display a plurality of unlocking blocks and a plurality of non-unlocking blocks when the electronic device 100 is working in a screen-locking mode. In step S620, the processor 120 detects a motion track generated when an object is touching the touch screen 110. After that, in step S630, the processor 120 determines whether the object has touched all of the unlocking blocks and whether the motion track is satisfied with the first unlocking sequence or the second unlocking sequence. If the object does not touch all of the unlocking blocks, or if the motion track is satisfied with neither the first unlocking sequence nor the second unlocking sequence, in step S640, the processor 120 will not make the screen-locking mode released. On the other hand, if the object has touched all of the unlocking blocks and the motion track is satisfied with the first unlocking sequence or the second unlocking sequence, in step S650, the processor 120 further determines whether the motion track is satisfied with the first unlocking sequence. If the motion track is not satisfied with the first unlocking sequence, the processor 120 determines that the motion track is satisfied with the second unlocking sequence. Thus, in step S660, the processor 120 loads some of the files. On the contrary, if the motion track is satisfied with the first unlocking sequence, in step S670, the processor 120 loads all of the files. Other details about steps S610~S670 of the method for unlocking screen provided by the present disclosure can be referred to the above descriptions relevant to the electronic device provided by the present disclosure, and thus they are not repeated herein.

To sum up, by using the electronic device and the method for unlocking screen provided by the present disclosure, the screen-locking mode can be released with all files or some files loaded according to a motion track generated after a user has touched all of the unlocking blocks. Therefore, the user can decide whether to allow personal files to be seen by other people by using different ways to unlock the screen of his/her electronic device under the circumstances that other people can sneak a look at the screen of the user's electronic device.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An electronic device, comprising:
 a touch screen, displaying a plurality of unlocking blocks and a plurality of non-unlocking blocks in a screen-locking mode of the electronic device;
 a storage, storing an unlocking code and a plurality of files, wherein the unlocking code corresponds to the unlocking blocks according to a first unlocking sequence and a second unlocking sequence, the first unlocking sequence is reverse to the second unlocking sequence, the first unlocking sequence corresponds to all of the files, and the second unlocking sequence corresponds to some of the files; and
 a processor, coupled to the touch screen and the storage, detecting a motion track of an object touching the touch screen;
 wherein the processor makes the screen-locking mode released and loads all of the files, when the object is touching the touch screen and the motion track is satisfied with the first unlocking sequence;
 wherein the processor makes the screen-locking mode released and loads some of the files, when the object is touching the touch screen and the motion track is satisfied with the second unlocking sequence; and
 wherein the processor controls the touch screen to display at least one image frame after the processor makes the screen-locking mode released, and data of unloaded files is not displayed in the image frame.

2. The electronic device according to claim 1, wherein the processor builds a relationship between the second unlocking sequence and some of the files according to an instruction generated through a setting interface displayed on the touch screen.

3. The electronic device according to claim 1, wherein the unlocking blocks and the non-unlocking blocks form a touch area, and the processor arranges the position of each unlocking block and the position of each non-unlocking block in the touch area according to an instruction generated through a setting interface displayed on the touch screen.

4. The electronic device according to claim 1, wherein some of the files corresponded to the second unlocking sequence have similar file types.

5. The electronic device according to claim 1, wherein the processor makes the screen-locking mode released and loads the files corresponded to the first unlocking sequence when the object has touched the unlocking blocks according to the first unlocking sequence within a predetermined time.

6. The electronic device according to claim 1, wherein the processor makes the screen-locking mode released and loads some of the files corresponded to the second unlocking sequence when the object has touched the unlocking blocks according to the second unlocking sequence within a predetermined time.

7. A method for unlocking screen, for making a screen-locking mode of an electronic device released, comprising:
 displaying a plurality of unlocking blocks and a plurality of non-unlocking blocks on a touch screen of the electronic device in a screen-locking mode, wherein the electronic device stores an unlocking code and a plurality of files, the unlocking code corresponds to the unlocking blocks according to a first unlocking sequence and a second unlocking sequence, the first unlocking sequence is reverse to the second unlocking sequence, the first unlocking sequence corresponds to all of the files, and the second unlocking sequence corresponds to some of the files;

detecting a motion track of an object touching the touch screen;

making the screen-locking mode released and loading all of the files, when the object is touching the touch screen and the motion track is satisfied with the first unlocking sequence;

making the screen-locking mode released and loading some of the files, when the object is touching the touch screen and the motion track is satisfied with the second unlocking sequence, wherein at least one image frame is displayed after the screen-locking mode is released, and data of unloaded files is not displayed in the image frame.

8. The method according to claim 7, wherein a relationship between the second unlocking sequence and some of the files is built according to an instruction generated through a setting interface displayed on the touch screen.

9. The method according to claim 7, wherein the unlocking blocks and the non-unlocking blocks form a touch area, and the position of each unlocking block and the position of each non-unlocking block in the touch area are arranged according to an instruction generated through a setting interface displayed on the touch screen.

* * * * *